Patented May 11, 1926.

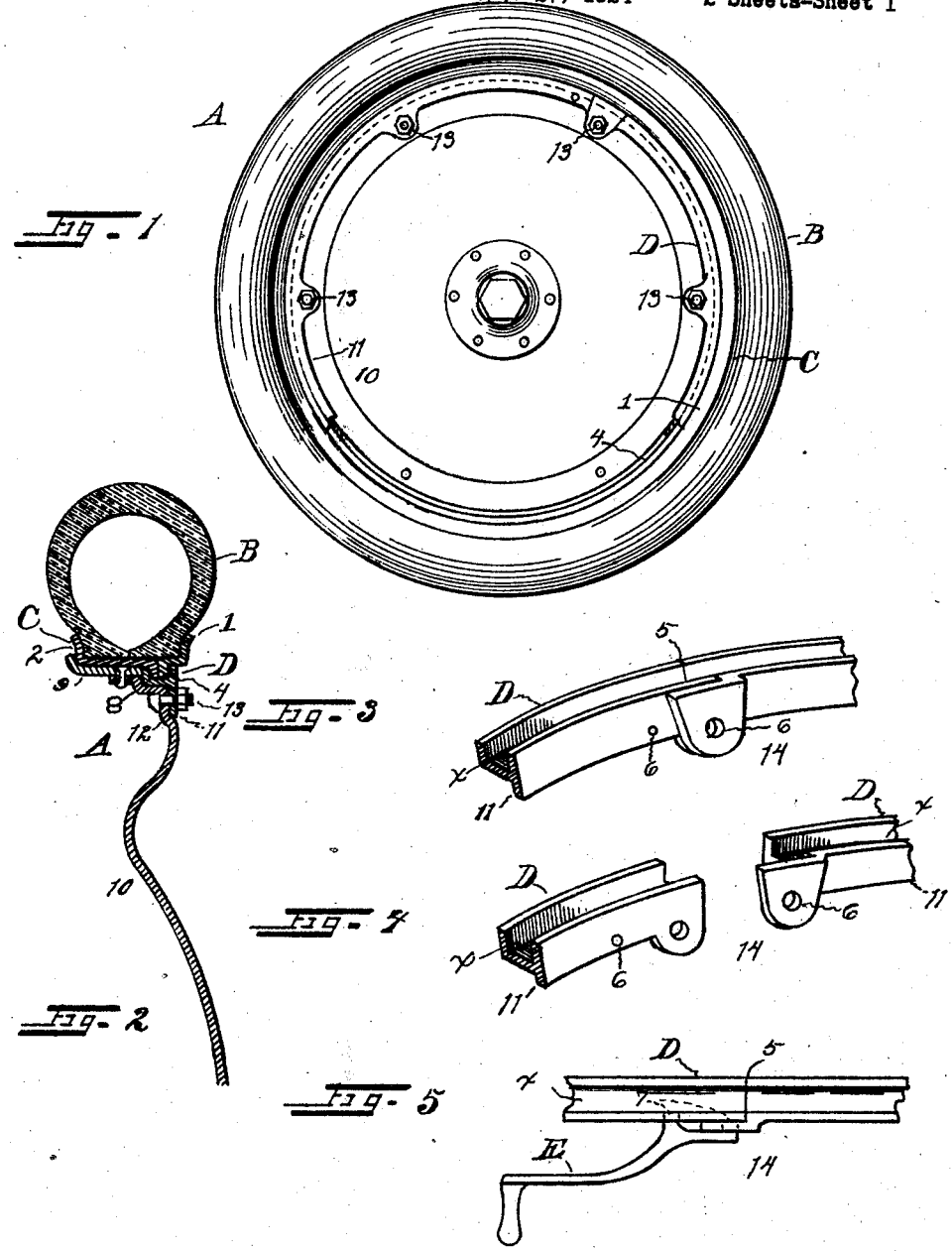

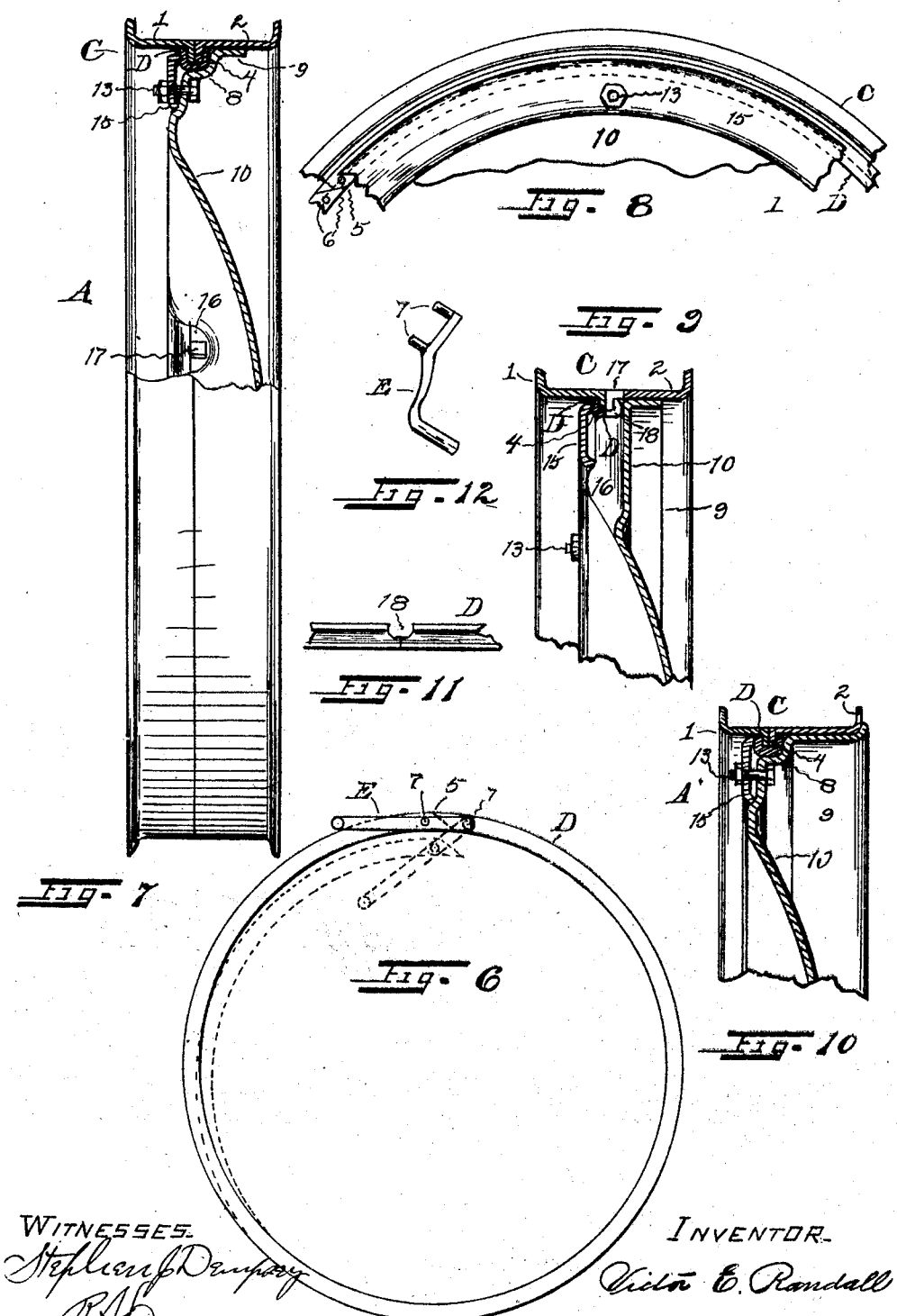

1,583,994

UNITED STATES PATENT OFFICE.

VICTOR E. RANDALL, OF BATTLE CREEK, MICHIGAN.

VEHICLE WHEEL.

Application filed September 27, 1924. Serial No. 740,304.

This invention has reference to vehicle wheels wherein demountable rims are used in connection with pneumatic tires.

My improved wheel in the main comprises four parts—a foraminous center, a two-part demountable rim, said rim being circumferentially divided and adapted to be fastened together by a transversely-parted circumferentially channeled retaining ring adapted to seat over depending ribs of the rim sections, the retaining ring being received into a side groove formed between the felloe or tread of the wheel and its disc or web center, and the whole fastened together by means of bolts passing through said web and through a depending apertured rim of said retaining ring or lugs of said ring, or of apertured clips or an apertured ring as commonly used for securing tire rims to wheels.

One of the important objects of the invention herein disclosed is to provide a demountable rim which shall possess the combined functions of a rim and means for its attachment to a vehicle wheel.

Another object of the invention is to provide a demountable rim of such construction that a tire may be easily and quickly placed thereon and removed, as expedient.

Another object of the invention is to so construct a rim that a tire may be placed thereon and inflated for use as a spare rim and tire.

Another object of the invention is to so construct a rim that the same may be circumferentially divided to permit a tire to be placed thereon or removed about its whole circumference without injury to its structure, as where tires are subjected to strain by prying to extract them from rigid side flanges.

Still another object of the invention is to so construct the means for connecting the separable rim sides that the same will be simple in construction, capable of being easily and speedily placed on or removed from the rims, firm and rigid when in operable position and neat in appearance; whereby the invention as a whole will provide a simple, neat, economical, enduring and thoroughly efficacious demountable rim for the purpose.

The invention will be more readily comprehended by reference to the accompanying drawings, wherein Figure 1 is an embodiment of my improved demountable rim as applied to a disc-wheel, a portion of the retaining ring being broken away to show the depending flange of the outer side section.

Fig. 2 is a detail cross-section of a vehicle wheel, its tire and the demountable rim at one of its bolt attachments.

Fig. 3 is a detail broken perspective view of a retaining ring with its ends connected.

Fig. 4 is a detail broken perspective view of a retaining ring separated at its ends.

Fig. 5 is a broken detail plan view of a retaining ring with a releasing tool in operative position for separating the abutting ends of said ring in the process of placing said ring or removing it from the rim sections.

Fig. 6 is a side view of a retaining ring with a releasing tool applied preparatory to buckling said ring in the manner of placing the same or removing it from the rim sections, the dotted lines showing the tool and the ring buckled for the purpose aforesaid.

Fig. 7 is a broken edge view of an automobile wheel showing a modified method of securing the rim to a wheel.

Fig. 8 is a detail broken side view of the same.

Fig. 9 is a detail cross-section of an automobile wheel and the rim at a point where the air valve stem is introduced.

Fig. 10 is a detail cross-section of an automobile wheel and the rim at a point where a bolt attachment is placed.

Fig. 11 is a detail broken plan view of a retaining ring at its connected ends, showing a recessed side for the admission of the air valve stem to the tube.

Fig. 12 is a perspective view of the retaining ring releasing tool.

In the drawings, like marks of reference refer to corresponding or equivalent parts in the different views in which A represents an automobile wheel; B, a pneumatic tire or casing; C, a circumferentially divided rim; D, a circumferentially-channelled retaining ring for securing the two sections of the rim intact; and E, a tool used in releasing the locking ring from the rim.

In the drawings I have shown a wheel of the steel disc type commonly used to which I have applied my improvements, it being understood that other than steel disc wheels could be used by certain modifications of the felloe to accommodate my improvements, the disc type of wheel being selected as better suited for the purpose, considering expense, strength and general utility.

The metallic rim C consists of two parts, 1 and 2, circumferentially divided between abutting depending ribs 4, each section of the rim having a side flange between the flanges of which a tire or casing B is adapted to be received in the usual manner. That the rim sections may be securely held intact, the circumferential channel x of a retaining ring D is fitted over the ribs 4 of said sections, as shown in Figs. 1, 2, 7, 8, 9 and 10.

The ring D is transversely separated as at 5, shown in Figs. 1, 3, 5, 6 and 8, that the same may be readily placed or removed from the rim sections in the operation of separating said sections to place or remove a tire or casing.

To facilitate the removal of the retaining ring, I provide a hole 6 in the retaining ring sides near its abutting ends, as shown, and that the abutting ends of the ring may be quickly and easily sprung apart and said ring warped or bent from its clinched position from the rim sections 1 and 2, or buckled as in Fig. 6, to accommodate the sections in assembling a rim, a lever E, in the form of a crank having two spaced side prongs 7, is employed. In the use of this lever the prongs 7 are thrust in the holes 6 of the ring and the crank moved in a plane with said ring, by which means a fulcrum is formed and a leverage exerted to separate the joint and release one or the other ends of the ring, from the ribs 4 of the rim sections, after which said ring may be readily removed.

A disc wheel need not materially differ from pressed or die formed wheels as at present in use, except that a groove, as 8 is formed in the outside of the wheel between its felloe or tread 9 and its disc or web center 10, for the snug reception of the rim-retaining ring D, as shown in Figs. 2 and 7.

When a retaining ring D is formed with a depending flanged portion 11, it is preferable that the wheel web also be formed with a supplemental grooved offset, as 12, to accommodate the flanged portion of said ring, as shown in Fig. 2, in which instance the ring D is attached to the wheel by means of bolts, as 13, passing through the web of the wheel and the flange of the ring.

In Figs. 3, 4 and 5, the retaining ring D is formed with apertured internally-depending lugs 14 for the reception of fastening bolts, and in the modification shown in Figs. 7, 8, 9 and 10, an apertured ring 15 is used for clamping the retaining ring D within the grooved offset of the wheel, the ring 15 in this instance being bolted to a wheel in all respects like those in general use.

In Figs. 7 and 9 I have shown modified forms in the wheel construction for the accommodation of the valve stem of pneumatic tires. In these figures an offset at 16 is pressed into the web of the wheel to form a housing or receptacle for a valve stem, a hole or slot 17 being formed through the rim coincident with said housing, through which hole said stem may be thrust and where a retaining ring, as D, is made to partially underlie a valve stem hole in a tire rim, an offset, as 18, being formed in one side of a ring through which a valve stem may be placed.

In the foregoing I have illustrated and described a preferred embodiment of my invention, and I reserve the right to use such modifications as would clearly apply to my improvement, the materials, proportions and finish of the various parts that enter into the manufacture of my improved wheel being left to the discretion and judgment of those skilled in the art to which it appertains.

It is believed a more extended explanation of my invention will not be necessary.

Having, therefore, set forth my invention, what I claim as new and desire to secure by Letters Patent, is:—

1. A demountable rim comprising two annular sections having outer tire-retaining flanges and inner depending ribs adapted to abut, a retaining ring having a circumferential channel adapted to fit over the abutting ribs of said rim sections and formed with interiorly-extending lugs having transversely-disposed bolting holes, said ring being severed at one place in its formation.

2. A demountable rim comprising two annular sections having outer tire-retaining flanges and inner depending ribs adapted to abut, a retaining ring having a circumferential channel adapted to fit over the abutting ribs of said rim sections and formed with interiorly-extending lugs having bolt-attaching holes, said ring being severed on a line radial to an axial center and in close proximity to one of its lugs.

3. A demountable rim, the combination with two annular rim sections having inner depending annular ribs adapted to abut, of a retaining ring having a circumferential channel adapted to engage over the abutting ribs of said rim sections and formed with interiorly extending bolt-attaching lugs, said ring being severed on a line radial to its axial center and in close proximity to a bolt attaching lug and having a transversely disposed hole in its side opposite the joint from said lug whereby a lever fulcrumed in said hole and engaging a hole in said lug may be used to contract said ring and release said rim.

VICTOR E. RANDALL.